United States Patent [19]

Siegmund

[11] 4,011,071
[45] Mar. 8, 1977

[54] METHOD OF MAKING GLASS SHAVING INSTRUMENT

[75] Inventor: Walter P. Siegmund, Woodstock, Conn.

[73] Assignee: American Optical Corporation, Southbridge, Mass.

[22] Filed: July 10, 1975

[21] Appl. No.: 594,826

[52] U.S. Cl. .............................. 65/31; 30/346.58; 30/346.53; 65/61; 65/4 R; 76/DIG. 8

[51] Int. Cl.² ................ C03C 15/00; C03C 23/20

[58] Field of Search ..... 30/346.58, 346.53, 346.57; 65/31, 61, 4 R; 76/DIG. 8, 104 R

[56] References Cited

UNITED STATES PATENTS

| | | | |
|---|---|---|---|
| 3,805,387 | 4/1974 | Siegmund | 30/346.53 |
| 3,851,392 | 12/1974 | Donovan | 30/346.58 |
| 3,861,040 | 1/1975 | Dorion, Jr. | 30/346.58 |
| 3,926,601 | 12/1975 | Hicks, Jr. | 65/31 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

A glass blade is produced from a preform of insoluble glass having a sharp edge encased in soluble glass. The encased preform is heated and drawn to the reduced cross-sectional size desired of the glass blade, cut transversely to length and leached for removal of the soluble glass and exposure of its sharp edge.

1 Claim, 11 Drawing Figures

METHOD OF MAKING GLASS SHAVING INSTRUMENT

BACKGROUND OF THE INVENTION

1. Field of the Invention

This invention relates to the manufacture of cutting instruments with particular reference to glass blades especially suited for use as shaving instruments.

2. Discussion of the Prior Art

Hitherto, instruments such as razor blades having cutting edges defined by two intersecting planes with a narrow included angle therebetween have been formed principally of ribbons of hardened stainless steel which are edge ground to an optimum performance included angle.

The useful life of such blades is seriously limited by corrosion due to normally experienced harsh environment and limited strength of the metal along the thin cutting edge when subjected to the toughness of beard hairs, for example. Such hairs, having a toughness equivalent to soft copper wire of like thickness, cause relatively rapid breakdown of the blades delicate cutting edge which is normally required to be less than 500 Angstroms in radius.

The present invention is directed to improvement of the aforesaid problems and has a principal objective, the provision of an improved cutting blade and method of making the same. Other objects and advantages of the invention will become apparent from the description of the invention which follows.

SUMMARY OF THE INVENTION

The aim of the invention is accomplished by providing a highly corrosive-resistant blade of glass and especially a method of producing such a blade with optimum edge sharpness and uniformity of included angle between intersecting planes defining the edge. To this end, a relatively large glass preform of the blade is made up with its intended cutting edge encased in a protective glass. The blade preform is constructed of an insoluble glass and the protective glass is selected to be of a soluble variety, i.e. readily leachable in hydrochloric acid, for example.

The thus encased preform is heated and drawn to the reduced cross-sectional size desired of the glass blade, cut transversely to length and leached for removal of the soluble glass and exposure of its sharp edge.

Details of the invention will become more readily apparent from the following description when taken in conjunction with the accompanying drawings.

IN THE DRAWINGS

DESCRIPTION OF THE PREFERRED EMBODIMENTS

Figure 1:
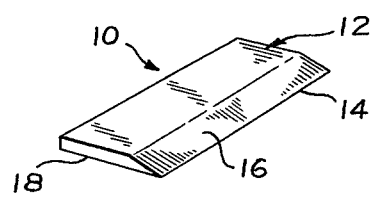
FIG. 1 is an illustration, in perspective, of an embodiment of the invention.

Referring more particularly to FIG. 1 of the drawings, blade 10 is exemplary of a type of shaving instrument (single-edged razor blade) to which the method is particularly suited.

Blade 10 has main body section 12 with edge 14 defined by the intersecting planes of surfaces 16 and 18.

A sequence of method steps which may be used to produce blade 10 according to the invention is illustrated in FIGS. 2-7 and comprises the following:

Two slabs 20 and 22 of respectively soluble and insoluble glasses are provided with ground and polished surfaces 24 and 26 which are fused together as block 28. The expression "insoluble" as used herein with reference to the glass of slab 22 and/or other pieces of glass hereinafter similarly described is intended to distinguish this glass from those which are relatively readily soluble or leachable, e.g. in hydrochloric acid.

Exemplary insoluble glasses are optical soda-lime, lanthanum crown, short flint and other crown and flint glasses. Soluble (leachable) glasses include borosilicates (i.e. glasses of high borax content), barium-lanthanum borosilicates and particularly a glass known commercially as Schott LaK-3, sold by Schott Optical Glass, Inc., of Duryea, PA, U.S.A. The latter glass has a coefficient of thermal expansion and a melting temperature which is compatible with ordinary soda-lime glass. Accordingly, a desirable combination of glasses for fused block 28 (FIG. 2) is soda-lime as the insoluble glass of slab 22 and LaK-3 as the soluble glass of slab 20.

Figure 2:
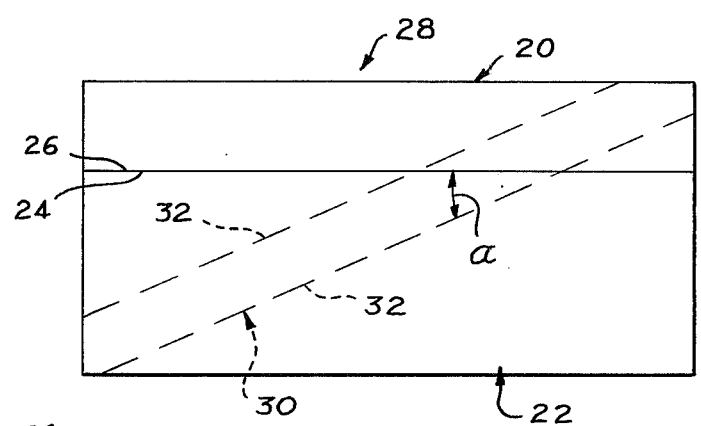
FIGS. 2-7 are illustrations of method steps useful for producing glass shaving instruments according to the invention.

Having fused slabs 20 and 22 together, preform 30 (FIG. 3) of blade 10 is cut or ground from block 28 along broken lines 32 (FIG. 2). Lines 32 cross the interface of fused surfaces 24 and 26 at an acute angle which is preselected according to the included angle desired between planes of surfaces 16 and 18 of blade 10 (FIG. 1).

It will become apparent hereinafter that interface 34 (FIG. 3) between soluble glass section 36 and insoluble glass preform 30 will ultimately become surface 16 of blade 10. Side 38 of preform 30 will become surface 18 of blade 10 and margin 40 of interface 34 will produce sharp edge 14 of blade 10, the included angle remaining constant throughout processing of preform 30.

Margin 40 of interface 34, with the protection afforded by fused section 36, is brought to maximum acuteness by highly polishing side 38 of preform 30 and the extension of section 38 accurately to an optical flat. This operation and other flat grinding and/or polishing operations used according to the invention may, because of the relatively large size of preform 30, be accomplished with the convenience, ease and economy of ordinary flat glass grinding and polishing apparatuses (not shown). Such apparatuses in their various forms are well-known to those skilled in the art. In simplest form, they may comprise a flat cast iron disc which is rotated about its axis and against which a side (e.g. side 38 of preform 30) may be pressed while an abrasive or polishing slurry is applied thereto.

Having so worked side 38 of preform 30 and brought margin 40 of interface 34 to maximum acuteness, margin 40 is next provided with protection against abrasive or distortion damage by further encasement with soluble glass. Slab 42 of soluble glass is fused to surface 38 of preform 30 and across the extension of section 36 thereby burying margin 40 relatively deeply within the glasses of section 36 and slab 42.

Figure 5:
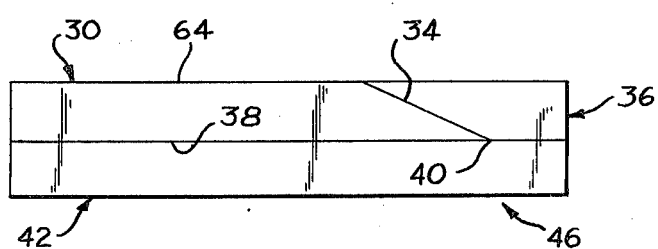
Figure 6:
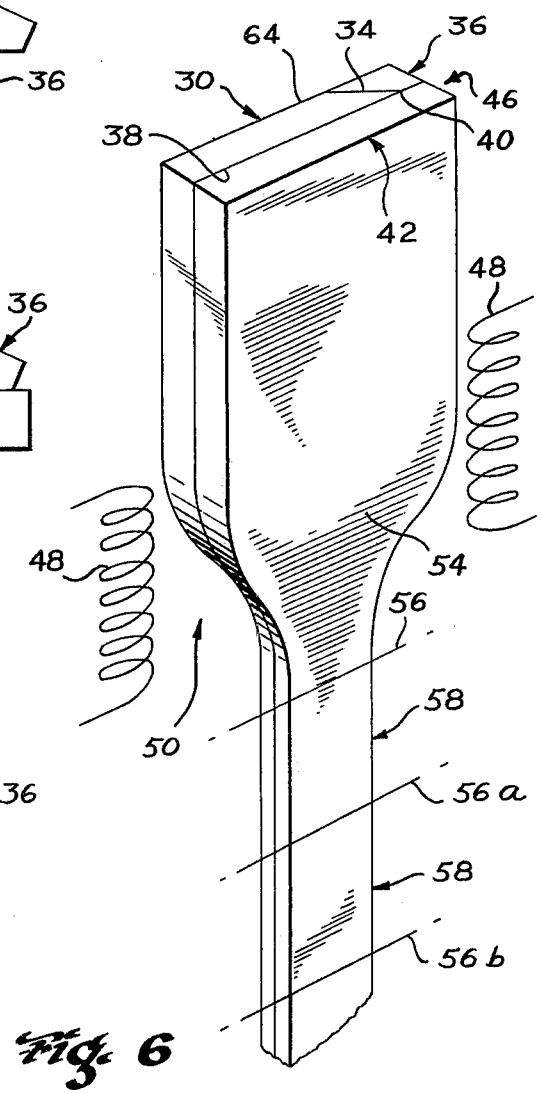
Figure 7:
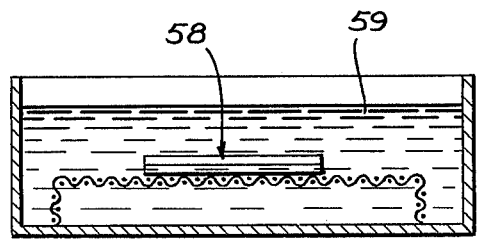

The fused unit of preform 30, section 36, and slab 42 is preferably trimmed to a uniform rectilinear configuration by cutting same along line 44 (FIG. 4) to the configuration illustrated in FIG. 5.

The thus formed glass boule 46 (FIGS. 5 and 6), which may be of any desired length as determined by preselection of the lengths of its component slab 22, 28 and 42 glasses, is zonally heated to drawing temperature with electrical heating coils 48 or other suitable heating devices. For a combination of the aforementioned exemplary LaK-3 soluble and soda-lime insoluble glasses a temperature of approximately 700° C in zone 50 will produce desirable results.

Boule 46 is then drawn longitudinally to a reduced cross-sectional size bringing preform 30 to the finished cross-sectional size desired of blade 10. During the drawing operation, heated zone 50 is moved progressively along the length of boule 40 (i.e. by moving boule 46 relative to coils 48 or vice versa) at a rate keeping pace with the removal of material from boule 48 by the formation of drawn section 52.

Section 52, being of the same cross-sectional configuration as that of boule 46 (FIG. 5) but much reduced in size, is next cut away from drawing cone 54 along line 56 and further transaxially into a desired number of lengths 58, e.g. along lines 56a and 56b, each corresponding to the length desired of blade 10.

Soluble glass components 36 and 42 of boule 46, in addition to protecting margin 40 of interface 34 against abrasion, chipping, flaking or other damage further prevent its dulling or rounding and/or other such distortion effects as may result from surface tension during heating and drawing.

Finally, immersion of each of cut lengths 58 into a suitable leaching medium 59 (FIG. 7) such as hydrochloric acid completes blade 10. This removes the soluble glasses of drawn components 36 and 42 and expose surfaces 12, 16 and 18 of the blade. Its resulting edge 14 (formally margin 40 of interface 34) requires no further grinding, polishing, honing or other sharpening as has been required heretofore in shaving instrument manufacture. However, a lubricant of Teflon, for example, may be applied to blade 10, if desired, to facilitate the blades use in a shaving operation.

Figure 8:
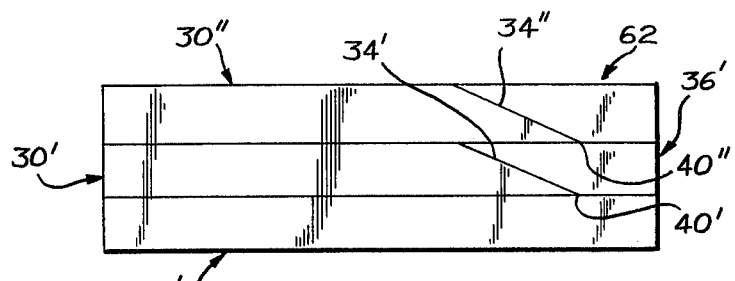
FIG. 8 illustrates a technique for producing a modified product of the invention.
Figure 9:
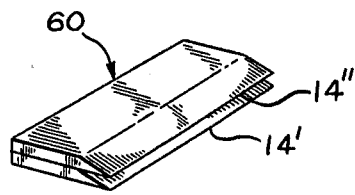
FIG. 9 is an illustration in perspective of the modified product.

FIGS. 8 and 9 illustrate a modification of the invention wherewith a multiple-edged blade 60 (FIG. 9) may be produced. This merely requires making up a boule 62 (FIG. 8) which comprises the fused addition of a preform 30 like that of FIG. 3 to a side 64 of a boule 46 like that of FIG. 5. Boule 62 (FIG. 8) can be seen to include slab 42' of soluble glass, preform 30' of insoluble glass, section 36' of soluble glass and an additional insoluble glass preform 30'' with its protective soluble glass section 36'. Thus, two glass interfaces 34' and 34'' are provided in boule 62 which have margins 40' and 40'' defining edges 14' and 14'' to be produced upon blade 60.

Heating and drawing boule 62 in the manner described with respect to boule 46, cutting its drawn section into lengths desired of blades such as blades 60, and leaching away the soluble protective glasses will provide the double-edged blade 60 product.

It should be understood that various other configurations of blade preforms encased in protective soluble glasses and the cutting instruments resulting therefrom may be produced according to the invention to meet particular requirements. For example, a more elaborate preform for producing a multiple-edged cutting instrument 64 (FIG. 11) is illustrated in FIG. 10.

Figure 3:
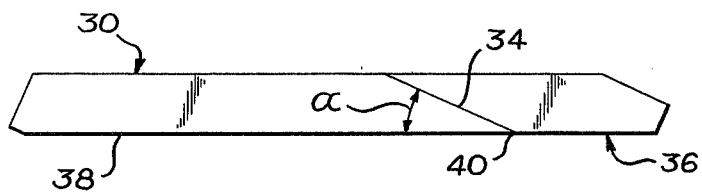
Figure 4:
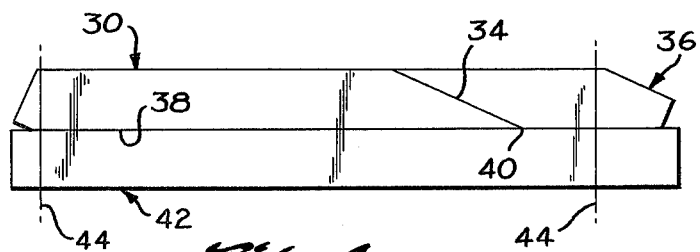
Figure 10:
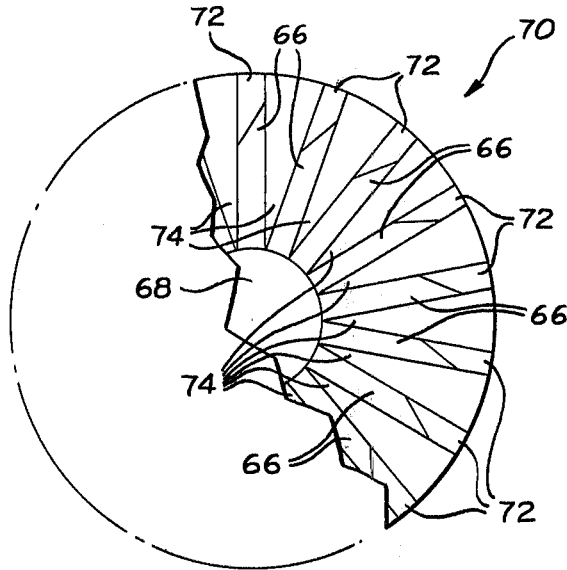
FIG. 10 illustrates still another modification of the present method.
Figure 11:
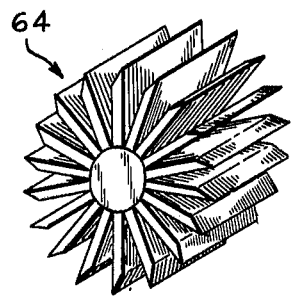
FIG. 11 is an end view of a multiple-edged instrument resulting from the method of the invention when modified according to FIG. 10.

The preform in FIG. 10 comprises a plurality of insoluble glass components 66 each similar to preform 30 of FIGS. 3 or 5. Components 66 extend radially away from insoluble glass rod 68 which forms the core of boule 70. Distal ends of component 66 are encased with soluble glass sections 72 and their opposite sides are encased with triangularly-shaped sections 74 of soluble glass. All glass components 66, 68, 72, and 74 are fused together.

Drawing boule 70 longitudinally to a reduced cross-sectional size and leaching all soluble glasses away therefrom will produce instrument 64.

All embodiments of the invention described above have been selected for purposes of illustration and are not to be interpreted as restrictive of the invention beyond that necessitated by the following claims.

I claim:

1. The method of making a cutting instrument of glass having at least one sharp edge comprising the steps of:

grinding and polishing a first flat surface on a slab of soluble glass;

grinding and polishing a second flat surface on a slab of insoluble glass;

assembling said slabs with one of said first and second flat surfaces placed against the other;

heating the assembly of said slabs to a temperature sufficient to interfacially fuse said first and second surfaces together;

cutting from said assembly at an acute angle across the fused interface of said first and second surfaces a preform, the plane of one side of said preform intersecting said second flat surface of said interface at an acute angle and producing a sharp edge therealong;

grinding and polishing said plane of one side of said preform to an optical flat to render said edge of maximum acuteness;

fusing a second slab of soluble glass to said ground and polished side of said preform to protectively encase said acute edge of said preform;

heating and drawing at least a portion of the fused unit of said preform and second slab of soluble glass in a direction substantially parallel to the direction of extension of said encased edge thereof and into a section of reduced cross-sectional size;

removing said section;

leaching away from said section all remaining soluble glass; and at any preselected stage of the method following said step of heating and drawing, cutting said section transaxially to a length desired of said instrument.

* * * * *